(12) United States Patent
Moran

(10) Patent No.: US 8,052,083 B1
(45) Date of Patent: Nov. 8, 2011

(54) BIRD DEFLECTOR AND AIR REPLACEMENT SYSTEM TECHNICAL FIELD

(76) Inventor: John Patrick Moran, Lakeland, FL (US)

( * ) Notice: Subject to any disclaimer, the term of this patent is extended or adjusted under 35 U.S.C. 154(b) by 19 days.

(21) Appl. No.: 12/586,094

(22) Filed: Sep. 17, 2009

(51) Int. Cl.
*B64D 33/02* (2006.01)
*B01D 46/00* (2006.01)
*B64C 1/14* (2006.01)

(52) U.S. Cl. .................. 244/53 B; 55/306; 60/39.092

(58) Field of Classification Search ............ 244/53 B, 244/121; 60/39.091, 39.092; 416/247 R; 55/306
See application file for complete search history.

(56) References Cited

U.S. PATENT DOCUMENTS

| | | | | |
|---|---|---|---|---|
| 2,969,941 A * | 1/1961 | Hobart, Jr. | ...... | 55/306 |
| 3,196,598 A * | 7/1965 | Olson | ...... | 55/306 |
| 3,449,891 A * | 6/1969 | Amelio et al. | ...... | 55/306 |
| 3,483,676 A * | 12/1969 | Sargisson | ...... | 55/306 |
| 3,667,704 A * | 6/1972 | Assmann | ...... | 244/53 B |
| 3,871,844 A * | 3/1975 | Calvin, Sr. | ...... | 55/306 |
| 4,004,760 A * | 1/1977 | Ando et al. | ...... | 244/53 B |
| 4,132,240 A * | 1/1979 | Frantz | ...... | 137/15.1 |
| 4,149,689 A * | 4/1979 | McDonald | ...... | 244/53 B |
| 4,833,879 A * | 5/1989 | Verduyn et al. | ...... | 60/39.092 |
| 5,411,224 A * | 5/1995 | Dearman et al. | ...... | 244/53 B |
| 6,089,824 A * | 7/2000 | Soares | ...... | 415/121.1 |
| D433,029 S * | 10/2000 | Eidson | ...... | D12/345 |
| 6,138,950 A * | 10/2000 | Wainfan et al. | ...... | 244/53 B |
| 6,598,384 B1* | 7/2003 | Adkins | ...... | 60/39.092 |
| 6,871,819 B2* | 3/2005 | Garric | ...... | 244/53 B |
| 7,866,600 B2* | 1/2011 | Barnard et al. | ...... | 244/53 B |
| 2010/0270427 A1* | 10/2010 | Barrientos et al. | ...... | 244/1 R |
| 2011/0011055 A1* | 1/2011 | Troy | ...... | 60/39.092 |

* cited by examiner

*Primary Examiner* — Joshua Michener
*Assistant Examiner* — Joseph W Sanderson

(57) ABSTRACT

A bird deflector and air replacement system for a jet engine, the bird deflector being conical or arcuate in shape as formed by suitable longitudinal and lateral interconnected bars, and the air replacement apparatus being one of a frustum or a selectively perforated tube or a modified cowl with cooperating external spaced-apart channels or openings formed therearound for directing additional air into the mainstream of the jet engine inlet. The system may be manufactured as an aftermarket add-on, or it may be manufactured as original cowl equipment for respective jet engine models.

5 Claims, 4 Drawing Sheets

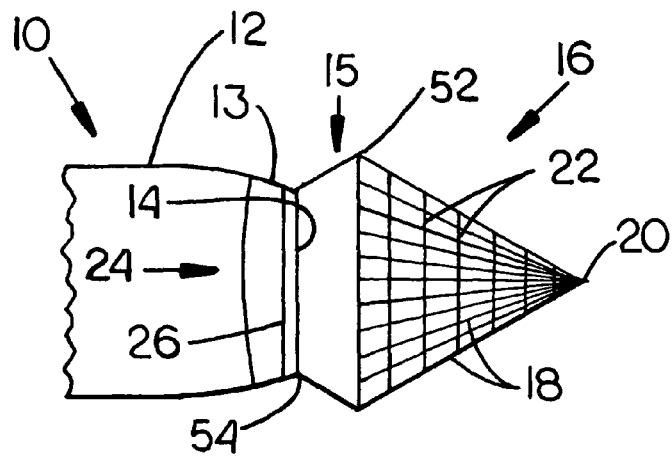
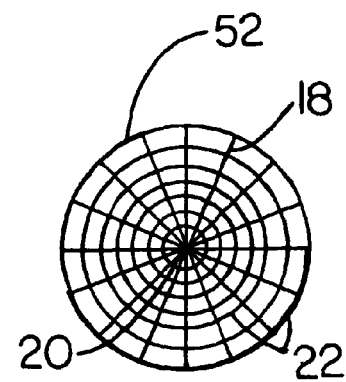
FIG.1    FIG.2
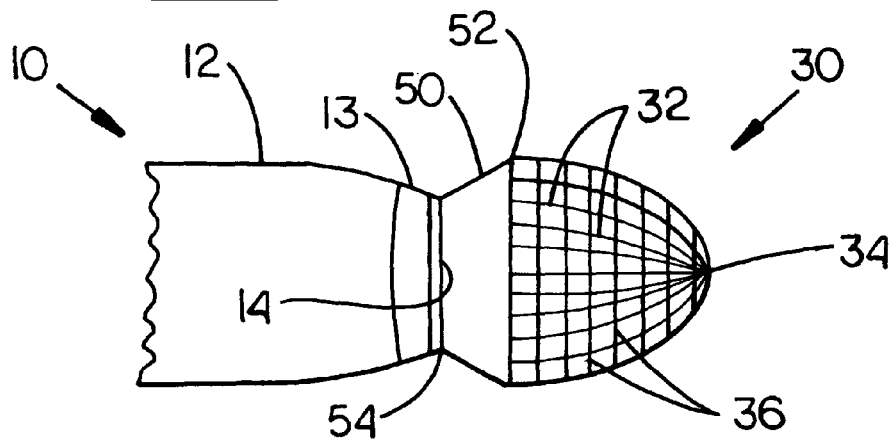
FIG.3
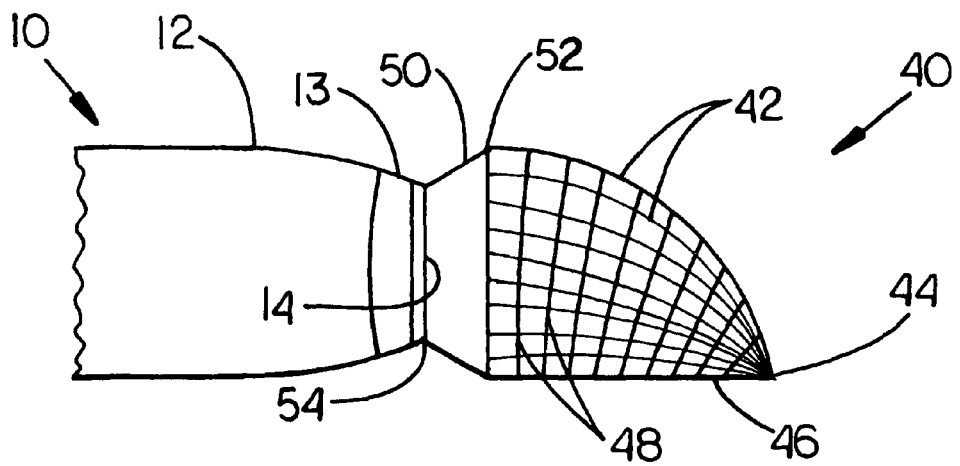
FIG.4

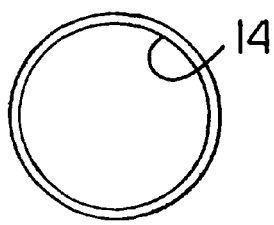 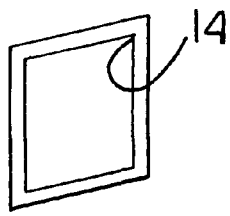 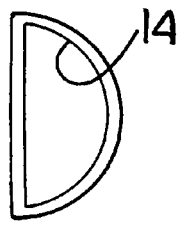 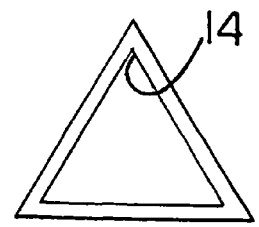
FIG.5A  FIG.5B  FIG.5C  FIG.5D
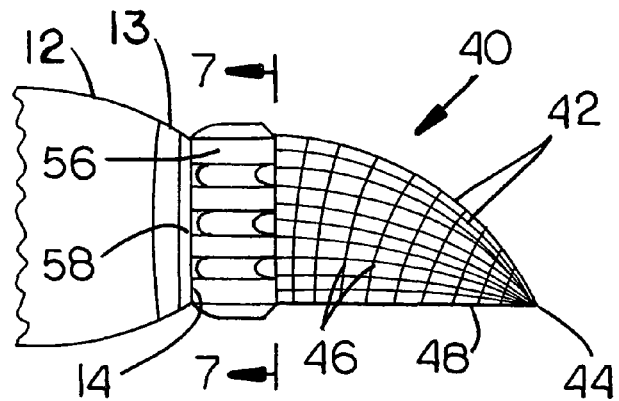
FIG. 6
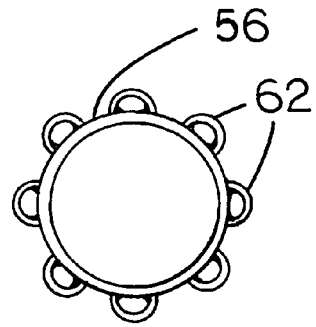
FIG. 7
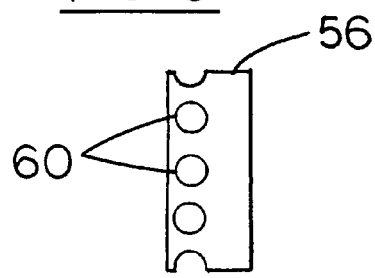
FIG. 8
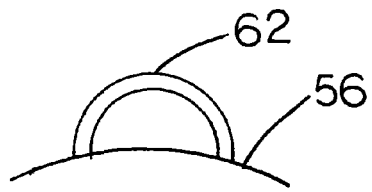
FIG. 10
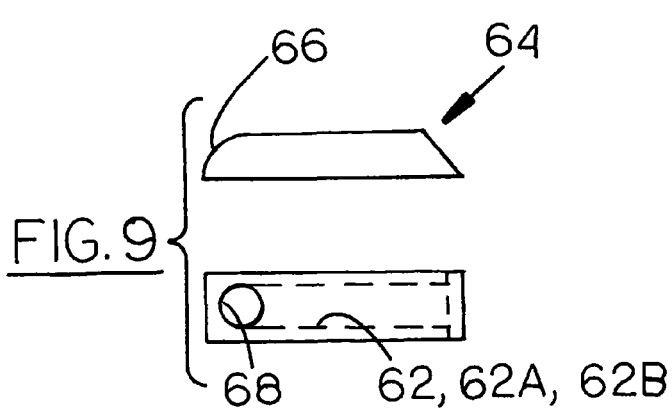
FIG. 9
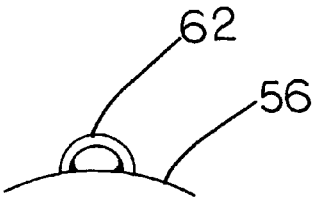

BIRD DEFLECTOR AND AIR REPLACEMENT SYSTEM TECHNICAL FIELD

TECHNICAL FIELD

This invention relates generally to jet engines' protection from bird strikes, and, more particularly, to a bird deflector and air replacement system for attachment to the frontal surface of a jet engine. Without such external protection, there have been many instances in the past where bird strikes have caused jet engines to fail.

BACKGROUND OF THE INVENTION

Bird Strike Committee USA was formed in 1991 to promote collection and analysis of accurate wildlife-strike data; promote development of new technologies to reduce wildlife hazards; facilitate exchange of information; and act as a liaison to similar organizations in other countries. It is directed by an eight-person steering committee comprised of two members each from: Federal Aviation Administration; Department of Defense; U.S. Department of Agriculture; and the aviation-industry Wildlife Hazards Working Group, with associate members from 16 other interested groups, including aircraft and aircraft-engine manufacturers, and U.S. military aviation groups.

The Committee meets annually in conjunction with Bird Strike Committee Canada at various airports or wildlife management areas in the U.S. or Canada.

The following data are of record:

Over 219 people have been killed world-wide as a result of bird strikes since 1988.

Bird and other wildlife strikes cost USA civil and military aviation over $600 million/year, 1990-2008, each year averaging more than 550,000 hours of aircraft downtime Fifty six thousand incidents were reported to the FAA between 1990 and 2004.

A few specific serious examples are: (1) On Jun. 3, 1995, an Air France Concorde ingested one or two Canada geese into the no. 3 engine when landing at JFK. The engine failed and shrapnel from it destroyed the no. 4 engine and cut hydraulic lines and control cables. The pilot landed the plane safely, but its damage was over $7 million. The French Aviation Authority sued the Port Authority of N.Y. and N.J. and settled for $5.3 million. (2) On Jan. 9, 1998, while climbing to 3,000 feet from Houston, a Boeing 727 struck a flock of snow geese and 3 to 5 birds were ingested into one engine. The engine lost all power and was destroyed. The flight returned safely to Houston. (3) On Sep. 4, 2003, a Fokker 100 struck at least 5 Canada geese after takeoff at La Guardia ingesting 1 or 2 into engine no. 2. The flight was diverted to nearby JFK. A fan blade separated from the disk and penetrated the fuselage.

Over 5,000 bird strikes were reported by the U.S. Air Force in 2007.

Over 7,600 bird and other wildlife strikes were reported for USA civil aircraft in 2007.

Studies indicate that only about 20% of bird strikes to civil aircraft at airports in USA are reported.

From 1990-2004, USA airlines reported 31 incidents in which pilots had to dump fuel to lighten load during precautionary or emergency landings after striking birds on takeoff or climb. An average 11,600 gallons of jet fuel were released in each of these dumps.

To-date, the only practical solutions are relatively primitive: scaring birds from runways by recordings of wild animals and propane cannons that create loud startling noises; and plotting flight paths that avoid heavy migration routes.

Per FAA regulations, currently, before a new engine model can be mounted on planes, it must first prove in a test facility that it is designed and constructed to be structurally and operationally tolerant, to the degree specified, after the ingestion of artificial birds or devices which simulate the mass, shape, density, and impact effects of birds weighing from 0.77 to 8.03 lbs. (0.35 to 3.65 kg.) (14CFR 33.76). These tests might not be rigorous enough, however, considering that the largest Canada geese weigh 14 pounds.

While rare for 2 jet engines to fail, the Bird Strike Committee USA wrote the safety board about 4 incidents in 2005-2007 in which both engines of airliners were damaged, namely, by yellow-legged gulls in Rome; canvasback ducks in Chicago; starlings in Washington, D.C.; and doves in Ohio. The latter Ohio aircraft lost all power, slid through an airport security fence and across a highway into a corn field.

On Jan. 15, 2009, the two engines of a U.S. Airways Airbus 320 carrying 155 passengers were struck by geese shortly after take off. Capt. Chesley Sullenberger safely landed the plane in the Hudson River.

On Jul. 9, 2009, an American Airlines flight made an emergency landing in St. Louis after a red-tailed hawk was pulled into an engine during take-off. The passengers and crew later flew to Los Angeles on another plane.

Bird strike hazards are increasing because bird populations in North America are growing and more planes are flying.

Technology also has a part in the growing threat from birds. Today's large passenger planes have fewer but more powerful engines than older models. That means it is easier for planes with only two engines to strike a flock of birds and lose power in both engines.

Since birds become habituated to the scare tactics normally used around airports and cease to be repelled or scared by them, U.S. Pat. No. 6,407,670 dated Jun. 18, 2002 described a "Wildlife Conditioning and Suppression System". That system, used in an area to be protected, included a radar sensor to detect the presence of moving targets, and processing means comprising a computer or programmable logic controller to determine if the moving targets are part of a flock. If so, a light and a speaker are activated. If the birds fail to egress, a high pressure water cannon capable of reaching all points in the protected area is activated.

Professor Edwin Herricks, a Civil and Environmental Engineering researcher has for much of the past decade coordinated an Airport Safety Management program, deploying avian radars at major airports around the country. His radar with array antenna and radar using parabolic dish antenna have been processing data at Seattle-Tacoma International airport and at the higher bird population Whidbey Island. Such avian radars are also to be deployed at Chicago's O'Hare International airport, New York's John F. Kennedy airport, Vancouver International Airport, and Dallas/Fort Worth airport over the next two to three years to assemble the data needed for the FAA to define procedures that may help pilots, air traffic controllers, and wildlife managers avoid a catastrophic bird strike accident. Professor Herricks' work will develop a quantitative measure of hazard throughout the day to identify critical periods, taking into account changes that occur between days and changes that occur between seasons. The hope is to understand how the relative risk of collisions with wildlife changes over time.

The director of the FAA Office of Airport Safety and Standards said that the FAA is spending between $750,000 and one million dollars a year on radar research.

While bird strikes have been part of overall aviation from the Wright brothers inception, strikes involving jet engines have been happening since the onslaught of the world's first known operational jet fighter, namely, the German Messerschmitt Me262, with its Junkers Mumo 004 engine. The Me262 became the most advanced warplane to see service in late 1944 and 1945 in WWII. This was too late and in too small a number for Germany to prolong the European war.

The Me 262, followed in 1947 by the Boeing XB-47, the most influential jet propulsion aircraft of all time, forever changed aircraft engine design and research programs from propeller driven designs to jet engine ramjet, impulse turbine, and reaction turbine designs.

The following heretofore known patents have been issued to cover screen or guard apparati for jet engine air inlets:
Hobart, Jr. U.S. Pat. No. 2,969,941 Jan. 31, 1961
Olson U.S. Pat. No. 3,196,598 Jul. 27, 1965
Assmann U.S. Pat. No. 3,667,704 Jun. 6, 1972
Calvin, Sr. U.S. Pat. No. 3,871,844 Mar. 18, 1975
Ando et al U.S. Pat. No. 4,004,760 Jan. 25, 1977
McDonald U.S. Pat. No. 4,149,689 Apr. 17, 1979
Verduyn et al U.S. Pat. No. 4,833,879 May 1989
Dearman et al U.S. Pat. No. 5,411,224 May 2, 1995
Soares U.S. Pat. No. 5,089,824 Jul. 16, 2000
Eidson D433,029 Oct. 31, 2000

None of these prior patents has solved the problem of interference with the required air flow dynamics by a frontal engine guard, inasmuch as any frontal interference whatsoever will impede airflow and cause added drag on the engine that makes huge differences in handling and controllability of the aircraft.

For this reason, this invention incorporates six embodiments of an air replacement apparatus in conjunction with the bird deflector and the jet cowl to replace the volume of air obstructed by the total area of the bird deflector components.

BRIEF SUMMARY OF THE INVENTION

A general object of the invention is to provide a bird deflector and accompanying air replacement system for use on an aircraft jet engine.

Another object of the invention is to provide a bird deflector and air replacement system which is attachable to the frontal inlet surface of a jet engine.

A further object of the invention is to provide a bird deflector and air replacement system suitable for permanent or temporary attachment to a jet engine.

A still further object of the invention is to provide a bird deflector and air replacement system, including a conically shaped bird deflector connected to a solid frustum attachable around the front opening in the cowl of a jet engine, the combination deflecting any frontal strikes from one or a flock of birds, and replacing the volume of air blocked by the total area of the deflector components.

Still another object of the invention is to provide a bird deflector and air replacement system, the deflector having a conical shaped body made up of a plurality of mesh-like elements connected to a solid frustum extending from suitable fasteners adaptable for attachment around the inlet of an aircraft jet engine.

A further object of the invention is to provide a bird deflector and air replacement system, the deflector having a plurality of equally spaced bars extending outwardly from a central point in a cone-shaped configuration with each free end connected to a solid air recovery frustum adaptable to being fastened immediately adjacent the inlet of an aircraft jet engine.

A still further object of the invention is to provide a bird deflector wherein spaced apart bar segments extend laterally between adjacent outwardly extending bars which form a conical configuration.

Yet another object of the invention is to provide a bird deflector for a jet engine formed by arcuate-shaped bars to assume an upper canopy-type configuration, with a curved or semi-circular forward edge, and having further lower bars extending from the semi-circular edge to an open upstream end of a frustum connected around the jet engine inlet.

Another object of the invention is to provide a bird deflector for a jet engine, consisting of an upper arcuate shape and an abutting lower upside down interconnecting arcuate shape, meeting as a rounded forward nose, with rectangular openings formed in each.

A still further object of the invention is to provide a frustum connected at its larger end to the bird deflector and at its smaller end to the jet inlet, and providing an inner surface area such that the air flow thereagainst is equal to the air flow blocked by the bird deflector.

Another object of the invention is to provide a bird deflector guard and a tube having a notched or perforated rear end between the deflector and the inlet of the jet engine, with channels mounted around the tube for directing air into the notched or perforated end.

Still another object of the invention is to provide the possibility of enhanced efficiency of the replaced air flow through channels formed as one of nozzles, venturis, or having an orifice formed therein.

A further object of the invention is to modify the jet engine cowl to serve as the air replacement apparatus in combination with a bird deflector.

A still further object of the invention is to provide perforations around a jet engine cowl, with a cylinder or frustum secured therearound to admit air to the flow entering through a perforated bird deflector.

These and other objects and advantages of the invention will be apparent when reference is made to the following description and accompanying drawings.

BRIEF DESCRIPTION OF THE DRAWINGS

FIG. 1 is a fragmentary side view of a frontal portion of a jet engine having a conical bird deflector and a first air replacement embodiment mounted thereon.

FIG. 2 is a front view of FIG. 1 showing bars forming the conical shape of the deflector and spaced bar segments secured between adjacent bars.

FIG. 3 is a side elevational view of a bird deflector having arcuate shaped bars and the first air replacement embodiment mounted on the cowl of a jet engine.

FIG. 4 is a side elevational view of an eagle's beak-shaped bird deflector and the first embodiment of an air replacement apparatus mounted on the cowl of a jet engine.

FIG. 5 is a front view of various known jet engine inlet opening shapes adjacent which the invention may be mounted. While most inlets are round, as circles or ovals, some, such as on the sides of a fighter plane, are D-shaped. Some, also, are three or four-sided.

FIG. 6 is a side elevational view of the eagle's beak-shaped bird deflector and a second embodiment of an air replacement apparatus mounted adjacent a jet engine inlet.

FIG. 7 is a front end view of the second air replacement embodiment, taken along the plane of the line 7-7 on FIG. 6, and looking in the direction of the arrows.

FIG. 8 is a side elevational view of a central portion of the second air replacement embodiment.

FIG. 9 is a side, front end, and bottom view of the outer portion of the second air replacement embodiment.

FIG. 10 is an alternate view of the FIG. 9 front end view.

DETAILED DESCRIPTION OF THE INVENTION

Figure 11:
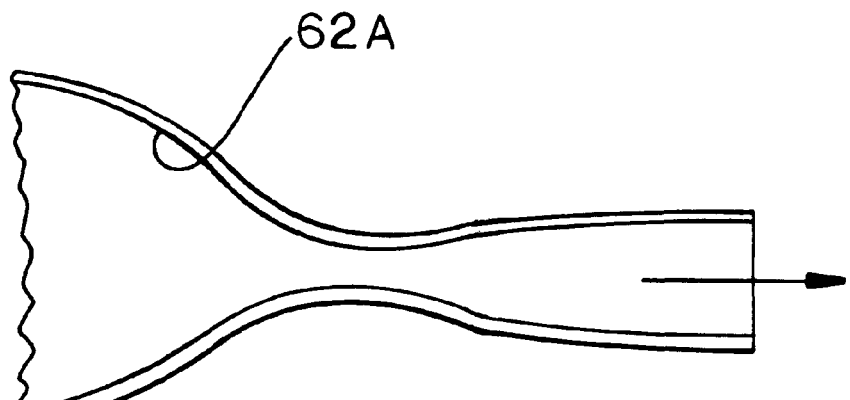
FIG. 11 is a side elevational view of a channel formed as a nozzle.

Referring now to the drawings in greater detail, FIG. 1 illustrates a fragmentary jet engine 10 having a nacelle 12 and inlet cowl 13, with an opening 14 around which a combination bird deflector and air replacement structure 15 is either permanently or detachably mounted. A generally conically shaped bird deflector 16 includes bars 18 (FIG. 2) extending outwardly from a central nose 20 in an equally spaced relationship. A plurality of bar segments 22 having progressively shorter lengths are secured between the adjacent outwardly extending bars 18. For larger deflectors 16, the segments 22 are progressively farther apart as they approach the nose 20.

The cross-sectional shapes of the various bars 18 and 22 may be one of round, four-sided, or triangular, with pointed edge directed outwardly. The various shapes may affect air flow differently at engine full power.

Suitable fasteners represented at 24 in FIG. 1 may consist of a full round or other shaped flanges 26 to connect the combination structure 15 around the jet engine inlet.

As shown in FIG. 3, a bird deflector 30 has an upper half formed by downwardly extending and converging arcuate-shaped bars 32, and a lower half formed by upwardly extending and converging arcuate-shaped bars 32, the two halves meeting as a rounded forward nose 34. A plurality of progressively shorter cross bars 36 are mounted between adjacent arcuate-shaped bars.

As shown in FIG. 4, a deflector 40 is a canopy type structure with downwardly extending arcuate bars 42 which terminate in a spaced apart relationship to form a partial circle 44 below the center of engine inlet, simulating an eagle's beak. Bottom bars 46 are bent as much as necessary to extend rearwardly from the partial circle 44. Cross bars 48 may be secured between adjacent bars 42 and 46.

As shown in FIGS. 1, 3 and 4, a frustum 50, which may be a frustum-like element of any shape, such as conforming to the shapes shown in FIG. 5, has a large opening 52 and a small opening 54 connected respectively between any of the three bird deflector embodiments and the jet engine inlet opening 14. The various rear ends of the longitudinal bars 18, 32, and 42 are suitably secured, as by welding, to the large end 52 of the frustum 50. Alternately, both the small opening 54 and the rear ends of the longitudinal bars may be secured adjacent the engine inlet opening 14, with the large opening 52 extended around the bird deflector.

It is a theory of this invention embodiment that the air flow blocked by the bird deflector components can be replaced by the air flow against the inside portion of the frustum 50 surface not blocked by the various deflector bars in front thereof, and then directed inwardly in front of the jet inlet 14. As such, the total air flow being sucked into the jet engine inlet will be equal to that which would normally occur when the bird deflector and air replacement combination are not in place. Some acceleration of the air through the converging length of the frustum 50 surface will have occurred in the sense of it being a large nozzle.

As a further alternate embodiment of the invention, in lieu of the frustum 50, a tube 56, or conduit of any shape, such as the shapes shown in FIG. 5, is provided intermediate any of the above described bird deflector designs and a suitable connection 58 around the inlet 14 of the jet engine body 12. Spaced apart openings 60, such as holes or edge notches (not shown) are formed adjacent the rear end of the tube 56.

Spaced apart streamlined channels 62 are formed at their bottom surfaces to conform to the outer surface of the tube 56. Each channel 62 is open at the front end 64 as a round or oval shape and closed at the rear 66, with a bottom edge opening 68 (FIG. 9) matching a respective opening 60 in the rear of the tube 56. Thus, air entering each front opening 64 will flow through openings 68 and 60 into the tube 56 to then be sucked into the jet engine inlet 14. As shown in FIG. 10, the channel 62 may have its opening conform to, and be open against, the outer surface of the tube 56.

The total air flow through the channels 62 must substantially equal the total air flow that is blocked by the bird deflector elements. As such, it is a theory of this second invention embodiment that the total air flow entering the jet inlet will equal the normal air flow therein when the deflector and replacement assembly are not in place.

To further deflect birds outwardly, the front channel ends 64 may be sloped rearwardly.

Figure 12:
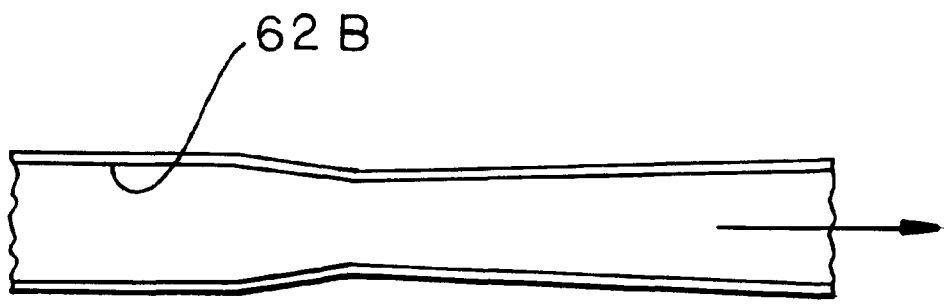
FIG. 12 is a side elevational view of a channel formed as a venturi tube.
Figure 13:
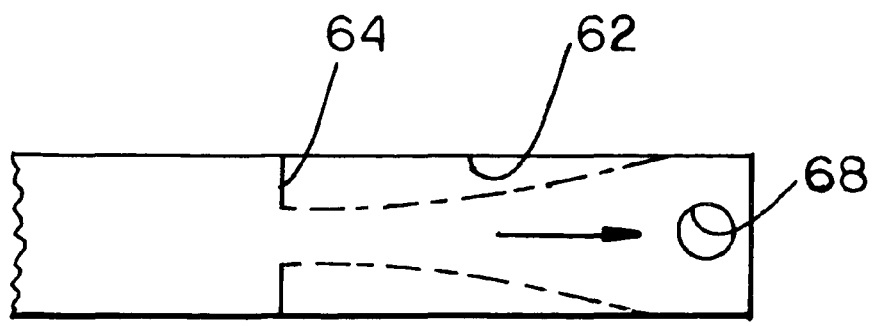
FIG. 13 is a side elevational view of a channel having an orifice formed therein.

While the channels 62 serve to replace air being blocked by the bird deflector components, their efficiency may be improved by being formed as either a nozzle 62A (FIG. 11) or a venturi tube 62B (FIG. 12), or by having an orifice 64 (FIG. 13) formed in the channel.

A nozzle 62A is a conduit with a variable cross-sectional area in which a fluid accelerates into a high-velocity stream. It may be convergent-divergent or simply convergent.

A venturi tube 62B is a device that consists of a gradually decreasing nozzle through which the fluid is accelerated, followed by a gradually increasing diffuser section that eliminates flow separation and allows the fluid to nearly regain its original pressure head.

An orifice 64 is a plate that is mounted inside a channel 62, and has a sharp edged aperture through which the fluid in the channel is accelerated.

Figure 14:
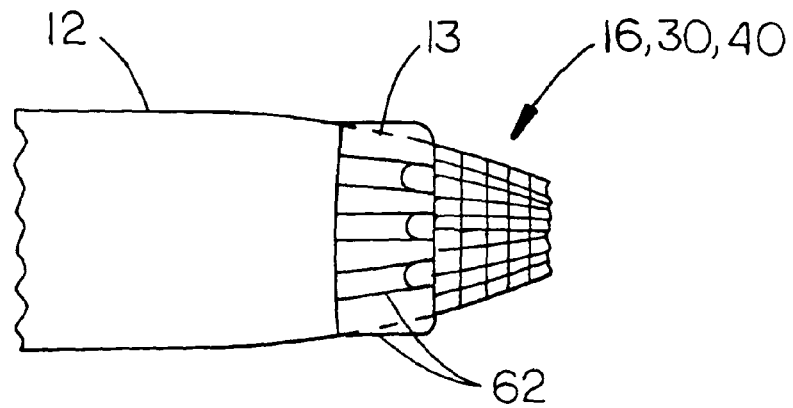
FIG. 14 is a side elevational view of the front portion of a jet engine, wherein the cowl of the engine is modified to comprise the air replacement apparatus.

As a still further alternate embodiment of the invention, it is also conceivable that the inlet cowl 13 of a jet engine may be modified to become an integral part of an air replacement apparatus. For example, the cowl 13 may have the shape of the frustum 50 of FIGS. 1, 3, and 4. Referring now to FIG. 14, the cowl 13, with its usual progressively expanding shape, replaces the tube 56 and has the openings 60 formed therein. The channels 62, with their openings 68 aligned with the openings 60, are mounted around the cowl. Preferably, the channels are shaped to attach to the cowl with a feathered rear edge to keep the height as low as possible. As such, each modified cowl 13 arrangement is secured to the body 12 or nacelle in the usual manufacturing manner. Some one of the above bird deflectors is mounted around the jet inlet 14.

As a further possible air replacement embodiment, and realizing that bird deflectors of any shape in front of the jet inlet hamper air flow suction, there may be some current engine cowl designs that lend themselves to modification. For example, the cowl of the above referenced Me262 Junkers Mumo 004 engine, for one, is a gradual arcuate continuation of the nacelle in which the engine is mounted.

As such, this invention embodiment teaches extending the cowl 13 as a cylinder to the plane of the normal inlet and having an inwardly extending flange 69 to provide a vertical frontal surface around an opening 14*a* equivalent to the usual inlet 14.

Figures 15, 16:
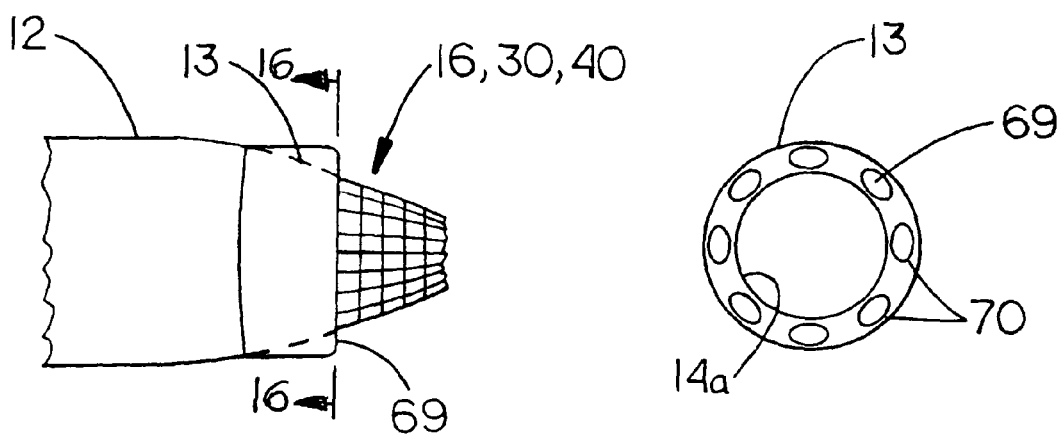
FIG. 15 is a side elevational view of the front portion of a jet engine, wherein the cowl of the engine is modified to serve as an air replacement apparatus, with the original shape of the cowl shown in phantom lines.
FIG. 16 is a view taken along the plane of the line 16-16 of FIG. 15, and looking in the direction of the arrows.

Small spaced-apart openings 70 are formed completely around that frontal surface flange 69 to receive a total air flow substantially equal to the air flow being blocked by the longitudinal and lateral bars of a bird deflector secured by suitable fasteners to the flange 69 immediately adjacent the opening 14*a*. This air replacement embodiment is shown in FIGS. 15 and 16, with the original cowl shape shown in phantom lines in FIG. 15.

Figures 17, 18:
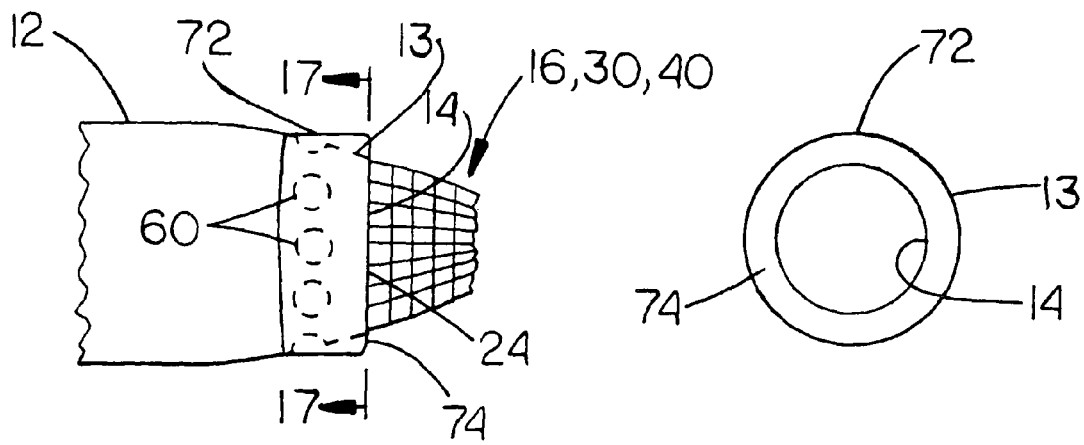
FIG. 17 is a side elevational view of a fragmentary bird deflector and a modified cowl and associated cover to serve as an air replacement apparatus.
FIG. 18 is a view taken along the plane of the line 18-18 of FIG. 17, and looking in the direction of the arrows.

In keeping with the aim to replace as much air as possible both through and around a bird deflector, it is noted that many nacelle 12 and cowl 13 shapes are streamlined to have the air inlet 14 as a smaller diameter than that of the nacelle 12. As such, with a suitable bird deflector in place, i.e., secured by a suitable fastening arrangement 24 around the air inlet 14, the spaced-apart circumferential openings 60, as shown in FIG. 17, are formed around the cowl 60.

A cylinder 72, or frustum is connected at its rear in a suitable manner, as by welding, to the usual connection between the nacelle 12 and the cowl 13, or immediately behind the openings 60, and extends to the plane of inlet 14, or just past the openings 60. In this embodiment, a substantial amount of air is sucked in by the jet engine through the opening 74 (FIG. 18), and thence, almost immediately, through the cowl openings 13 to make up for the air being blocked by the bird deflector components.

INDUSTRIAL APPLICABILITY

Tests would determine the required number and preferable cross-sectional shapes of bars 18, 32, 42 and 46, bar segments 22, and cross bars 36 and 46, i.e. round, triangular, or rectangular, that would be most suitable for deflecting birds of sizes ranging from sparrows to herons, while presenting as small a total area as possible.

Tests would also determine the type of metal alloy, such as titanium alloy, or plastic, or suitable carbon fiber materials, such as possibly in carbon nanotube technology, for the bars and cross bars which could be as small n cross section as possible while being strong enough to withstand the impact of various size birds.

In keeping with the theories of the invention embodiments, air flow tests in a test facility for a given engine model could determine the compatible deflector design and any of the frustum or tube and channel shapes or cowl modifications which provide a total air flow equivalent to the air flow which would occur if no deflector and air replacement apparatus were present.

While three bird deflector, two add-on air replacement embodiments and several original cowl air replacement embodiments of the invention have been shown and described, other modifications thereof are possible. Once the amount of air that is blocked by a particular bird deflector is measured, as in a test facility, further cowl modifications may be readily tested. For example, in lieu of the cowl having either a sloped or a frustum shape, it could have a tubular shape with the bird deflector secured to the forward end thereof, thereby admitting additional air. Additionally, sloping cowls on some nacelle streamlined shapes could simply be perforated for testing, without the cover 72 shown in FIG. 17, 18.

The invention claimed is:

1. A bird deflector and air replacement system for a jet engine inlet, comprising longitudinal and lateral members forming a contoured perforated guard open at the rearward end thereof, a tube having its forward end connected to the open end of the perforated guard, and its rear end connected adjacent the inlet of the jet engine, and a plurality of spaced-apart streamlined open front and closed rear channels mounted on the outer surface of the tube, with matching openings formed in the tube and the bottom of each channel, wherein the total air flow through the plurality of channels substantially equals the total air flow blocked by the longitudinal and lateral members.

2. The bird deflector and air replacement system describe in claim 1, wherein the longitudinal members are sloped to meet at a forward end thereof, and the lateral members extend between respective adjacent longitudinal members at spaced intervals therealong.

3. The bird deflector and air replacement system describe in claim 1, wherein the tube is shaped to conform to the inlet shape of the jet engine.

4. The bird deflector and air replacement system describe in claim 1, wherein said channels are formed as one of nozzles or venturi tubes or each having an orifice formed therein.

5. A bird deflector and air replacement system for a jet engine having an inlet cowl, comprising longitudinal and lateral members forming a contoured perforated guard open at the rearward end thereof and connected adjacent the inlet of the inlet cowl, and a plurality of spaced-apart streamlined open front and closed rear channels mounted on the outer surface of the inlet cowl, with matching openings formed in the inlet cowl and in the bottom of each channel, wherein the total air flow through the plurality of channels and matching openings substantially equals the total air flow blocked by the longitudinal and lateral members of the bird deflector.

* * * * *